United States Patent [19]

Wu

[11] Patent Number: 4,650,594

[45] Date of Patent: Mar. 17, 1987

[54] COMPOSITION AND METHOD FOR CORROSION INHIBITION

[75] Inventor: Yulin Wu, Bartlesville, Okla.

[73] Assignee: Phillips Petroleum Company, Bartlesville, Okla.

[21] Appl. No.: 655,832

[22] Filed: Oct. 1, 1984

[51] Int. Cl.$^4$ .......................... C23F 11/16; C23F 11/04

[52] U.S. Cl. .................................. 252/8.555; 166/902; 252/395

[58] Field of Search .......................... 252/8.55 E, 395; 528/109; 523/463; 568/46; 166/902

[56] References Cited

U.S. PATENT DOCUMENTS

| | | | |
|---|---|---|---|
| 2,831,830 | 4/1958 | Schroeder | 528/109 |
| 3,291,776 | 12/1966 | Newey et al. | 528/109 X |
| 3,567,782 | 3/1971 | Warner | 252/395 |
| 3,746,685 | 7/1973 | Dobinson | 528/109 |
| 4,031,023 | 6/1977 | Musser | 252/406 X |
| 4,472,569 | 9/1984 | Gray et al. | 528/109 |

FOREIGN PATENT DOCUMENTS 2082589  3/1982  United Kingdom.

*Primary Examiner*—Herbert B. Guynn
*Assistant Examiner*—S. Wolffe
*Attorney, Agent, or Firm*—J. E. Phillips

[57] ABSTRACT

A corrosion-inhibiting composition and method of inhibiting corrosion on metal surfaces are described. The composition comprises a reaction product of (a) a first constituent selected from an epoxide having an average of at least about one vicinal epoxide per molecule and a halogenated aliphatic compound having at least one displaceable halogen and (b) a second constituent comprising a dimercaptan. The reaction product in a hydrocarbon diluent is an effective corrosion inhibitor when applied to metal surfaces in highly corrosive environments, and is designed particularly for downhole metal surfaces of oil drilling equipment.

5 Claims, No Drawings

COMPOSITION AND METHOD FOR CORROSION INHIBITION

This invention relates to the treatment of metal surfaces to increase their resistance to corrosion. It further relates to compositions which form a corrosion-inhibiting film on metal surfaces to which they are applied. In a specific embodiment, the invention relates to corrosion-inhibiting treatment of downhole surfaces of oil-drilling equipment. In a further specific embodiment, the invention relates to corrosion-inhibition in oil recovery operations involving the use of polymeric agents. In a further specific embodiment, the invention relates to epoxy-based corrosion inhibitors having a long shelf life.

The problem of corrosion of metal surfaces in contact with air and water is well known. Corrosion and pitting are accelerated in environments in which metal surfaces are in contact with corrosive chemicals such as hydrogen sulfide, carbon dioxide and organic acids, and water having a high electrolyte concentration. Such environments are typical of downwell conditions in oil and gas wells, in which corrosion of metal pipes, pumps and other equipment poses a serious problem requiring monitoring of well sites, frequent maintenance and costly replacement of parts. Oil recovery operations in deepsea oil fields present these corrosion problems in their most extreme form. The downwell metal surfaces are in contact with large quantities of corrosive chemicals such as dissolved acid gases present in the recovered oil, and the metal surfaces are subjected to temperatures of 90° C. or higher and pressures of 1000 psig or higher, the extreme conditions of temperature and pressure acting to accelerate corrosion and to intensify the problems of applying and maintaining chemical protection for the equipment.

Commercial corrosion-inhibiting agents are often not effective at all under such extreme conditions or reduce corrosion significantly for only a short period of time and then must be reapplied, often at great expense and inconvenience if the well site is not easily accessible or, as in the case of offshore wells, poses difficulties of transporting and applying large volumes of chemicals. In post-primary oil recovery operations involving the use of break-through polymers, severe corrosion on downwell equipment and tubing can result from the incompatibility of some conventional corrosion-inhibiting agents with the break-through polymers. The use of epoxy-based corrosion inhibitors can be difficult if the shelf life of the composition is short and does not accommodate premixing and transportation to the site of application.

It is therefore an object of this invention to provide a composition which can be applied to a metal surface to inhibit corrosion of the metal. It is a further object of the invention to provide a method of treating metal surfaces so as to form a film which inhibits corrosion on the metal even under extreme conditions of temperature and pressure and in highly corrosive environments. It is a further object of the invention to provide an epoxy-based corrosion-inhibiting composition which has a relatively long shelf life. It is a further object of the invention to provide a composition and method for treating downwell surfaces of oil drilling equipment and tubing which is effective in the presence of polymeric agents.

SUMMARY OF THE INVENTION

According to the invention, there is provided a composition which, when applied to a metal surface, forms a corrosion-inhibiting film on the metal surface, the composition comprising the reaction product of (a) a first constituent selected from an epoxide containing an average of about one or more vicinal epoxide per molecule and a halogenated aliphatic compound bearing at least one displaceable halogen and (b) a second constituent comprising a dimercaptan. In one embodiment, the reaction is carried out in a hydrocarbon diluent/carrier optionally containing an alcohol in such a manner that conversion of the mercaptan groups is essentially quantitative and, for the halogenated aliphatic compound, the displacement of the halogen is essentially quantitative.

The composition is an effective and durable corrosion inhibitor in highly corrosive environments and in the presence of oil recovery agents such as aqueous polyacrylamides. It has a relatively long shelf life.

DETAILED DESCRIPTION OF THE INVENTION

The first component of the invention composition is selected from epoxide-bearing substrates and active halogen-bearing substrates. The epoxy may be saturated or unsaturated, aliphatic, cycloaliphatic aromatic or heterocyclic, and may bear substituents which do not materially interfere with the reaction. It may be monomeric or polymeric.

Included in the suitable epoxide-bearing substrates are monoepoxides described by the following formula:

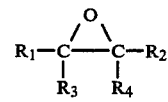

wherein the groups $R_1$, $R_2$, $R_3$ and $R_4$ represent hydrogen, aryl, aralkyl, alkaryl, alkyl, hydroxyalkyl, cycloalkyl, cycloalkylene with the total number of carbon atoms varying over the range of 2 to 16. Any two of the R groups can collectively represent divalent alkylene radicals to form 5 and 6 membered rings bearing the epoxide moiety. Representative monoepoxides suitable for use in the present process include: ethylene oxide; propylene oxide; glycidol; 1,2-epoxyhexane; styrene oxide; 3-p-tolyl-1,2-epoxypropane; 4,5-epoxyoctane; 1-cyclohexyl-1,2-epoxycyclohexane; 1,4-dicyclohexyl-2,3-epoxybutane; 1,2-epoxycyclopentane, and the like.

Epoxy resins suitable for use in the invention have molecular weights generally within the range of about 50 to 10,000, preferably about 200 to about 1500. The commercially-available Epon ®828 epoxy resin, a reaction product of epichlorohydrin and 2,2-bis(4-hydroxyphenyl)propane (bisphenol A) and having a molecular weight of about 400 and an epoxide equivalent (ASTM D-1652) of about 185–192, is an example of a suitable epoxy resin.

Suitable substrates bearing displaceable halogen are exemplified by halomethylated aromatics, haloethers, haloalcohols, haloesters or halothioethers with the proviso that each substrate contains one or more displaceable halogen per molecule and the total number of carbons varies over the range of 2 to 8. Representative halogenated compounds include 2-chloroethyl ether, methyl chloroacetate, 3-chloro-1,2-propanediol, 2-chloroethyl thioether, benzyl chloride and the like. It is contemplated that the halogenated substrate lacking an oxygen-containing hydroxyl or ether grouping would require reaction with dimercaptans containing such groupings to produce the desired β-alkoxythioethers. Representative reactions of these materials with dimercaptans are shown below.

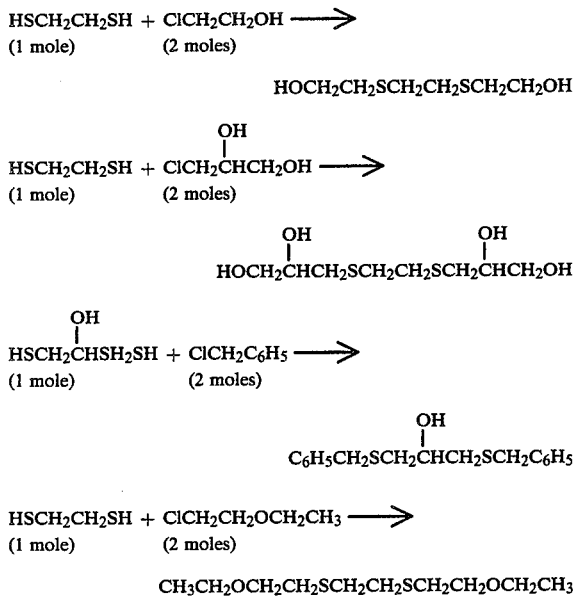

In general, the corrosion-inhibiting compositions of the instant invention are characterized by the presence of beta-hydroxythioether moieties prepared by the reaction of a dimercaptan with a suitable monoepoxide substrate (E):

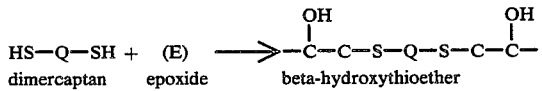

Alternatively, the corrosion-inhibiting compositions of the instant invention are characterized by the presence of beta-alkoxythioether moieties prepared by the reaction of a dimercaptan with a suitable halogenated substrate (R') containing a beta-haloether grouping.

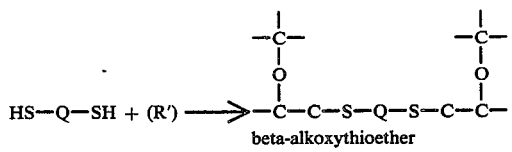

Suitable dimercaptans are described by the following formula: HS-Q-SH, wherein Q represents linear or branched alkylene, cycloalkylene, arylene, hydroxyalkylene and alkoxyalkylene with the proviso that the dimercaptans contain 2 to 6 carbon atoms. Representative dimercaptans include 1,2-ethanedithiol; 1,3-propanedithiol; 1,2-cyclohexanedithiol; 1,4-cyclohexanedithiol; 1,4-dimercaptobenzene; 2-hydroxy-1,3-propanedithiol; 1-methyl-1,2-ethanedithiol and the like. 1,2-Ethanedithiol is presently preferred because of its availability and the effectiveness of its derivatives in the corrosion-inhibiting compositions.

The reactants can be combined in any amount desired, including amounts in which the equivalent ratio of the first constituent to the second constituent is within the range of about 0.5:1 to 11:1, but for actual field use the first constituent will generally be present in the reaction mixture in an amount of about 0.6 to about 1.4 equivalent weight per equivalent weight of the second constituent. The preferred compositions of the instant process are prepared by essentially stoichiometric reaction of dimercaptans with monoepoxides in solvent blends comprising aromatic hydrocarbons and low molecular weight alcohols over the temperature range of 20° C. to 180° C. preferably over the temperature range of 25° C. to 75° C. In practice, to obtain essentially stoichiometric reaction, the epoxide can be used in an amount of about 1 to about 20 percent above that required by the stoichiometry. Thus, the equivalent ratio of epoxide to dimercaptan is preferably at least about 1:1 and is desirably in the range of 1:1 to 1.2:1. It is preferable to permit the reaction mixture to stand at ambient temperature for a time, preferably about 24 to about 72 hours or more to allow the reaction to be completed, prior to application.

Suitable aromatic hydrocarbon solvents include the isomeric xylenes, toluene, benzene, naphtha, cyclohexylbenzene, fuel oil, diesel oil, heavy aromatic oils, Stoddard solvent, crude oil, and condensate from gas wells. Presently, xylene is the preferred hydrocarbon diluent because of its availability and compatibility with all the components of the inventive system. In general, the higher-boiling aromatic hydrocarbons would be preferred for deeper wells with higher downhole temperatures.

Suitable alcohols contain 1 to about 15 carbon atoms such as methanol, ethanol, 1-propanol, 2-propanol, butanols, pentanols, hexanols, heptanols, octanols, 1-pentadecanol and mixtures thereof. Polyols containing 2 to 5 carbon atoms such as ethylene glycol; 1,3-propanediol; 2,3-butanediol, glycerol and pentaerythritol can also be used. Presently, the preferred solvent system contains methanol as the alcohol component.

Various alcohol-aromatic hydrocarbon azeotropes can be used as the reaction medium for the preparation of the glycidol/1,2-ethanedithiol adduct. Representative azeotropes include the following, with the weight percent of each component in parenthesis: methanol (39.1)/benzene (60.9); ethanol (32)/benzene (68); 2-propanol (33.3)/benzene (66.7); 1-propanol (16.9)/benzene (83.1); isobutyl alcohol (9.3)/benzene (90.7); 1-butanol (68)/p-xylene (32); 2-pentanol (28)/toluene (72) and hexanol (13)/p-xylene (87). It is also contemplated that impure alcohol streams such as mixed butanols resulting from oxo technology using propylene feedstock can be used as the alcohol component in preparative reaction media.

It is preferable that all of the mercaptan groups be converted to beta-hydroxythioethers or beta-alkoxythioethers because of the foul odor attributable to the —SH moiety. In the instant corrosion inhibitor compositions, it is necessary that the odor be controlled if these compositions have to be handled by workers at the field sites. In view of this, the equivalent ratio of dimercaptan to epoxide or displaceable halogen preferably does not exceed about 1:1. It is contemplated that trace odors of dimercaptan in the instant compositions can be removed by post-treatment of said compositions with, for example, low molecular weight epoxides such as glycidol to effectively "cap-off" any remaining mercaptan groups. This procedure simply completes the conversion of all —SH groups into beta-hyroxythioethers.

The invention compositions are useful for inhibiting corrosion of metal surfaces, particularly surfaces of objects made from iron and steel. It is particularly useful for treating metal surfaces such as metal pipes and casings in oil, gas and geothermal wells, which are subjected to high temperatures and pressures and corrosive chemical agents.

An additional feature of the invention corrosion-inhibiting compositions is their effectiveness in the presence of polymeric mobility control agents such as polyacrylamide and permeability contrast correction systems based on aluminum citrate and polyacrylamide. In wells treated with such polymeric agents, a corrosion-inhibiting film on the inner surfaces of downwell piping may be contacted by the polymeric agents or by-products of gel deterioration as they are recovered back through production wells. The agents can strip away the protective film, necessitating costly reapplication. The present compositions exhibit superior stability in the presence of such permeability contrast agents.

Down-well treatments with the corrosion-inhibiting compositions can be effected by a variety of methods depending upon the particular chemical and physical characteristics of the well being treated. When treating metal surfaces, particularly in down-well applications, the corrosion-inhibiting composition can be applied by contacting the metal surfaces with the reaction products, such as beta-hydroxythioether, or sequentially with a solution of the dimercaptan component and a solution of the epoxy or halogenated component to produce a corrosion-inhibiting beta-hydroxythioether insitu.

Batch Treatment. The corrosion inhibitor is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours before resuming production, usually at least 2 hours.

Extended Batch Treatment. The corrosion inhibitor is injected into the annular space of a cased wellbore, the well is closed off, and the composition is continuously circulated with well fluids down the annulus and up the tubing for an extended period of time, which can vary widely but will usually be between 2 and 48 hours depending upon the depth of the well. At the end of the determined time period, the well is returned to production.

Squeeze Treatment. The corrosion inhibitor is injected down a cased wellbore penetrating a subterranean formation and is forced into the formation against formation pressure with high-pressure pumps. The composition can be injected within a gelled or dispersed polymer matrix based, for example, on polyacrylamides, biopolysaccarides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment. A highly concentrated slug of the corrosion inhibitor is injected into the tubing of a cased borehole and pressured down the tubing with a fluid column of diesel, produced gas, nitrogen or a brine solution such as 2 weight percent aqueous potassium chloride. When the pressure is released, the excess corrosion-inhibiting composition is produced up the tubing. The composition as a concentrated slug thus contacts the metal walls of the tubing and lays down a protective film as it flows in a downward and upward circuit.

Continuous Treatment. A solution of the corrosion-inhibiting agent is continuously injected into the annulus of a cased borehole and produced up the tubing. The volume of injected fluid is regulated to any desired volume per unit time by the use of conventional pumping procedures.

Metal surfaces can also be protected by dipping or spraying the surfaces with the invention compositions and then allowing excess fluid to drain from the treated surfaces at ambient conditions.

EXAMPLE I

This example describes the preparation and testing of a corrosion-inhibiting composition comprising the product resulting from the reaction of glycidol and 1,2-ethanedithiol in a mixture of xylene and methanol.

A charge of 7.8 g (105 mmoles) of glycidol, 4.7 g (50 mmoles) of 1,2-ethanedithiol and 12.5 g of a 1:1 wt/wt mixture of xylene and methanol was placed in a 50 mL round-bottomed flask fitted with a water cooled reflux condenser and the mixture was boiled for about 48 hours under a nitrogen atmosphere. The cooled reaction mixture separated into two phases and the product possessed essentially no mercaptan odor, indicating the quantitative conversion of mercaptan groups to thioether groups.

Aliquots of each phase of the reaction mixture were tested for corrosion-inhibiting effectiveness. Laboratory corrosion inhibition tests were carried out in 1-liter Erlenmeyer flasks equipped with magnetic stirring bars, under laboratory conditions designed to simulate corrosive oil-water environments encountered in field drilling sites. A charge of 50 mL of NBU crude oil and 950 mL of a synthetic brine was used in each run along with the corrosion inhibitor. A slow stream of carbon dioxide was bubbled through the solution during each test to maintain the mixture near saturation with $CO_2$ at ambient conditions. The rate of corrosion and pitting index were determined using a CORRATOR ® monitoring system available from Rohrback Instruments. A carbon steel probe was suspended in the stirred oil-water mixture maintained at about 49° C. during each run. Test results are summarized in Table I. The CORRATOR ® test runs involved the use of 0.2 mL aliquots of the reaction mass, 50 mL NBU crude oil and 950 mL of NBU brine.

TABLE I

| 1,2-Ethanedithiol/Glycidol Adduct Corrosion Inhibitor | | |
|---|---|---|
| Elapsed Time (Hours) | Run 1* C.R.$^a$/P.I.$^b$ | Run 2** C.R.$^a$/P.I.$^b$ | Run 3# C.R.$^a$/P.I.$^b$ |
| 1.50 | 0.1/0.1 | 53/11 | 82/7 |
| 2.66 | 0.01/0.08 | 39/1 | 100/20 |
| 4.66 | 0.01/0.04 | 20/1 | 100/25 |
| 5.66 | 0.01/0.02 | 15/2 | 100/25 |
| 6.50 | 0.01/0.01 | 14/1 | 95/25 |

TABLE I-continued

1,2-Ethanedithiol/Glycidol Adduct Corrosion Inhibitor

| Elapsed Time (Hours) | Run 1* C.R.$^a$/P.I.$^b$ | Run 2** C.R.$^a$/P.I.$^b$ | Run 3# C.R.$^a$/P.I.$^b$ |
|---|---|---|---|
| 19.33 | 0.1/0.36 | 1.2/0.1 | 44/13 |
| 21.33 | 0.12/0.4 | 1.2/0.2 | 41/12 |

$^a$C.R. Represents corrosion Rate (mpy).
$^b$P.I. represents Pitting Index.
*Aliquot was taken from bottom phase of reaction mass.
**Aliquot was taken from upper phase of reaction mass.
This run indicates that the corrosion inhibition, was not due to the excess glycidol charged to the reactor.

Referring to the results in Table I (see invention runs 1 and 2), it is evident that the active corrosion inhibitor is concentrated in the lower phase of the reaction mass because the corrosion rate decreased much faster in run 1 than in run 2. Control Run 3 illustrates that the excess glycidol charged to the reactor (and presumably remaining after all the 1,2-ethanedithiol had reacted) did not function as a corrosion inhibitor, as evidenced by the much higher corrosion rates observed in run 3.

EXAMPLE II

This example describes the preparation and testing of a corrosion-inhibiting composition comprising the product resulting from the reaction of n-butyl glycidyl ether and 1,2-ethanedithiol in a mixture of xylene and methanol.

A charge of 2.28 g (17.5 mmoles) of n-butyl glycidyl ether, 0.94 g (10 mmoles) of 1,2-ethanedithiol and 3.84 g of a 1:1 wt/wt mixture of xylene and methanol was placed in a 25 mL round-bottomed flask fitted with a water cooled reflux condenser and the mixture was boiled for about 48 hours under a nitrogen atmosphere. The cooled reaction mixture was essentially free of any mercaptan-like odor.

Corrosion tests were carried out in the above reaction mass in the same manner as described in Example I. Duplicate samples were tested and the results are summarized in Table II. The CORRATOR® test runs involved the use of 0.2 mL aliquots of the reaction mass, 50 mL NBU crude oil and 950 mL of NBU brine.

TABLE II

1,2-Ethanedithiol/n-Butyl Glycidyl Ether Adduct Corrosion Inhibitor

| Elapsed Time (Hours) | Run 1 C.R.$^a$/P.I.$^b$ | Run 2 C.R.$^a$/P.I.$^b$ |
|---|---|---|
| 2.17 | 16/3 | 13/2 |
| 3.66 | 3.4/0.1 | 1.5/0.2 |
| 4.66 | 1.6/0.7 | 0.88/0.12 |
| 5.66 | 1.1/0.1 | 0.5/0.02 |
| 21.17 | 0.28/0.07 | 0.07/0.02 |
| 26.17 | 0.22/0.08 | 0.05/0.01 |

$^a$C.R. represents Corrosion Rate
$^b$P.I. represents Pitting Index

Referring to the results in Table II (duplicate samples in runs 1 and 2), it is evident that the reaction mass resulting from the chemical reaction of 1,2-ethanedithiol and n-butyl glycidyl ether is an effective corrosion inhibitor. This example further demonstrates that an effective inhibitor can be prepared by reacting a slight excess of the dimercaptan (20 meq) with the monoepoxide (17.5 meq).

EXAMPLE III

This example demonstrates the effectiveness of the invention compositions under lab designed to simulate production wells in fields undergoing aluminum citrate/polyacrylamide polymerfloods for permeability contrast correction. Selected results are summarized in Table III. Laboratory tests were carried out in essentially the same manner as described in Example I.

TABLE III

Corrosion Inhibitors in the Presence of Aluminum Citrate-Polyacrylamide Mixtures

| Run No. | System | Rate of Corrosion (mpy Hrs.) | Pitting Index | Type of Run |
|---|---|---|---|---|
| 1 | Aluminum Citrate | 2.3 (18) | 0.3 | Control |
| 2 | Polyacrylamide | 1.2 (18) | 0.2 | C |
| 3 | AC/PAM Mix$^a$ | 2.5 (18) | 0.4 | C |
| 4 | Epoxy + Duomeen-T + CH$_3$OH Aluminum Citrate + Polyacrylamide | 0.65 (18) | 0.35 | |
| 5 | Epoxy + Duomeen-T + CH$_3$OH | 0.015 (20) | 0.035 | |
| 6 | Nalfloc 9DC-932$^c$ + AC/PAM Mix$^a$ | 19 (20) | 3 | C |
| 7 | Tretolite Kp-2023$^c$ + AC/PAM Mix$^a$ | 29 (20) | 7 | C |
| 8 | Duomeen-T Aluminum Citrate + Polyacrylamide | 0.71 (21) | 0.13 | |
| 9 | 1,2-EDT$^b$ + AC/PAM Mix$^a$ | 0.74 (20) | 0.03 | Control |
| 10 | 1,2-EDT$^b$ + Epoxy Resin$^d$ + AC/PAM Mix$^a$ | 0.19 (20) | 0.02 | Invention |
| 11 | 1,2-EDT$^b$ + Epoxy Resin$^d$ + AC/PAM Mix$^a$ | 0.06 (21) | 0.05 | Invention |
| 12 | 1,2-EDT$^b$ + Epoxy Resin$^d$ + AC/PAM Mix$^a$ | 0.15 (20) | 0.03 | Invention |

$^a$AC/PAM Mix represents systems into which were injected aliquots of aluminum citrate solution and aliquots of polyacrylamide solution. In runs 1 and 2, aliquots of stock solutions of aluminum citrate and polyacrylamide were used. The aluminum citrate stock solution was prepared by dissolving 12 g AlCl$_3$.6H$_2$O and 7.35 g Na$_3$C$_6$H$_5$O$_7$.2H$_2$O in 40 mL of distilled water. The aqueous polyacrylamide stock solution was 500 ppm polyacrylamide. In the above runs, 0.3 mL of the stock solutions were introduced into the Corrator ® test flasks.
$^b$1,2-EDT represents 1,2-ethanedithiol and 0.1 mL was added as received.
$^c$Nalfloc 9DC-932 (0.2 mL added) and Kp-2023 (0.2 mL added) represent commercially available fatty amine derivatives which are corrosion inhibitors.
$^d$Epoxy resin in these runs was EPON ® 828 with a molecular weight of about 400 and an epoxide equivalent of 185–192. The epoxy resin was introduced as an aliquot of a stock solution prepared by mixing 3 parts by weight of resin and 1 part by weight of xylene or, alternatively, 3 parts by weight of resin and 5 parts by weight of xylene.

Referring to the results in Table III, it is evident that a significant corrosion rate is observed in the presence of added aluminum citrate (run 1), added polyacrylamide (run 2) and in the presence of aluminum citrate/polyacrylamide mixtures (run 3). The results in runs 6 and 7 indicate that commercially-available corrosion inhibitors such as derivatives of fatty amines were relatively ineffective in the presence of aluminum citrate and polyacrylamide. Run 9 illustrates the moderate effectiveness of 1,2-ethanedithiol in the presence of aluminum citrate and polyacrylamide. Runs 10 and 11 demonstrate the superior effectiveness of the invention system in inhibiting corrosion in the presence of aluminum citrate and polyacrylamide. The molar ratios of 1,2-ethanedithiol to EPON ®828, respectively, in runs 10, 11 and 12 were 7:1, 5:1, and 1:1.

In run 10, 0.1 mL of 1,2-ethanedithiol (0.0012 mole of 1,2-EDT) and 0.1 mL of an epoxy resin solution in xylene (0.000135 mole of EPON ®828) were used.

In run 11, 4.2 mL of 1,2-ethanedithiol (0.05 mole of 1,2-EDT) and 5.33 g of an epoxy resin solution in xylene (0.01 mole EPON ®828) were used.

In run 12, 0.85 mL of 1,2-ethanedithiol (0.01 mole of 1,2-EDT) and 5.33 g of an epoxy resin solution in xylene (0.01 mole of EPON ®828).

I claim:
1. A composition which forms a corrosion-inhibiting film when applied to a metal surface, the composition comprising a solution of (1) a reaction product produced by reacting constituents which consist of
(a) a first constituent selected from the group consisting of
(i) epoxy resins with molecular weights within the range of about 200 to 1500 containing an average of at least one vicinal epoxide per molecule,
(ii) monoepoxides described by the formula

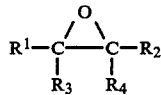

wherein the groups R₁, R₂, R₃ and R₄ represent hydrogen, aryl, aralkyl, alkaryl, alkyl, hydroxyalkyl, cycloalkyl, cycloalkylene containing 2 to 16 carbon atoms or n-alkyl glycidyl ether and
(iii) halogenated compounds selected from the group consisting of halomethylated aromatics, haloethers, haloalcohols, haloesters and halothioethers having at least one displaceable halogen per molecule and containing 2 to 8 carbon atoms, and
(b) a second constituent consisting of dimercaptan containing from 2 to 6 carbon atoms wherein the equivalent ratio of the first constituent to the second constituent is in the range of about 0.6:1 to about 1.4:1, said reaction product being a beta-hydroxy- or beta-alkoxythio ether
(2) an aromatic hydrocarbon diluent, and
(3) methanol.

2. A composition according to claim 1 in which
(a) the first constituent is selected from the group consisting of
(i) epoxy resin with a molecular weight of about 400,
(ii) monoepoxides selected from the group consisting of ethylene oxide, propylene oxide; glycidol; 1,2-epoxyhexane; styrene oxide; 3p-tolyl-1,2-epoxypropane; 4,5-epoxyoctane; 1-cyclohexyl-1,2-epoxybutane; 3-phenyl-1,2-epoxypropane; 1,2-diphenylethylene oxide; 1,2-epoxycyclohexane; 1,4-dicyclohexyl-2,3-epoxybutane and 1,2-epoxycyclopentane or n-butyl glycidyl ether, and
(iii) halogenated compounds including 2-chloroethanol, 2-chloroethyl ether, methyl chloroacetate, 3-chloro-1,2-propanediol, 2-chloroethyl thioether and benzyl chloride, and
(b) the second constituent is selected from dimercaptans selected from the group consisting of 1,2-ethanedithiol; 1,3-propanedithiol; 1,2-cyclohexanedithiol; 1,4-cyclohexanedithiol, 1,4-dimercaptobenzene; 2-hydroxy-1,3-propanedithiol; and 2-ethoxy-1,3-propanedithiol.

3. The composition of claim 2 in which the first constituent is said epoxy resin and the second constituent is said 1,2-ethanedithiol.

4. The composition of claim 2 in which the first constituent is said glycidol and the second constituent is said 1,2-ethanedithiol.

5. The composition of claim 2 in which the first constituent is said n-butyl glycidyl ether and the second constituent is said 1,2-ethanedithiol.

* * * * *